United States Patent

[11] 3,549,825

| [72] | Inventor | Cebern B. Trimble<br>Dayton, Ohio |
|---|---|---|
| [21] | Appl. No. | 668,528 |
| [22] | Filed | Sept. 18, 1967 |
| [45] | Patented | Dec. 22, 1970 |
| [73] | Assignee | The National Cash Register Company<br>Dayton, Ohio<br>a corporation of Maryland |

[54] MAGNETIC TRANSDUCER WITH PLANAR SPIRAL COIL EXTENDING INTO THE GAP
7 Claims, 20 Drawing Figs.

[52] U.S. Cl.................................................... 179/100.2,
29/603; 335/282; 336/200, 336/232; 340/174.1;
346/74
[51] Int. Cl...................................................... G11b 5/12,
G11b 5/42; G01d 15/12
[50] Field of Search........................................... 29/603,
606, 598; 335/282; 336/200, 232; 179/100.2C;
340/174.1F; 346/14MC

[56] References Cited
UNITED STATES PATENTS

| 2,536,272 | 1/1951 | Friend.......................... | 179/100.2 |
|---|---|---|---|
| 2,618,709 | 11/1952 | Eckert, Jr., et al............ | 179/100.2 |
| 2,843,829 | 7/1958 | Slate............................ | 336/200 |
| 2,852,617 | 9/1958 | Thiele......................... | 179/100.2 |
| 3,058,078 | 10/1962 | Hoh............................. | 336/200 |
| 3,089,106 | 5/1963 | Saaty........................... | 336/232 |
| 3,344,237 | 9/1967 | Gregg.......................... | 179/100.2 |

Primary Examiner—J. Russell Goudeau
Attorneys—Louis A. Kline, Albert L. Sessler, Jr. and Elmer Wargo ABSTRACT: A planar magnetic transducer comprising a planar coil means, in the general shape of a spiral, with at least a portion of the coil means being sandwiched between the pole ends of two magnetic circuit plates. The method utilizes printed circuit techniques to batch-fabricate single and bifilar coil transducers which may be miniature in size.

PATENTED DEC 22 1970     SHEET 01 OF 10     3,549,825

(PRIOR ART)

INVENTOR
CEBERN B. TRIMBLE

BY
HIS ATTORNEYS

INVENTOR
CEBERN B. TRIMBLE
BY
HIS ATTORNEYS

INVENTOR
CEBERN B. TRIMBLE
BY
HIS ATTORNEYS

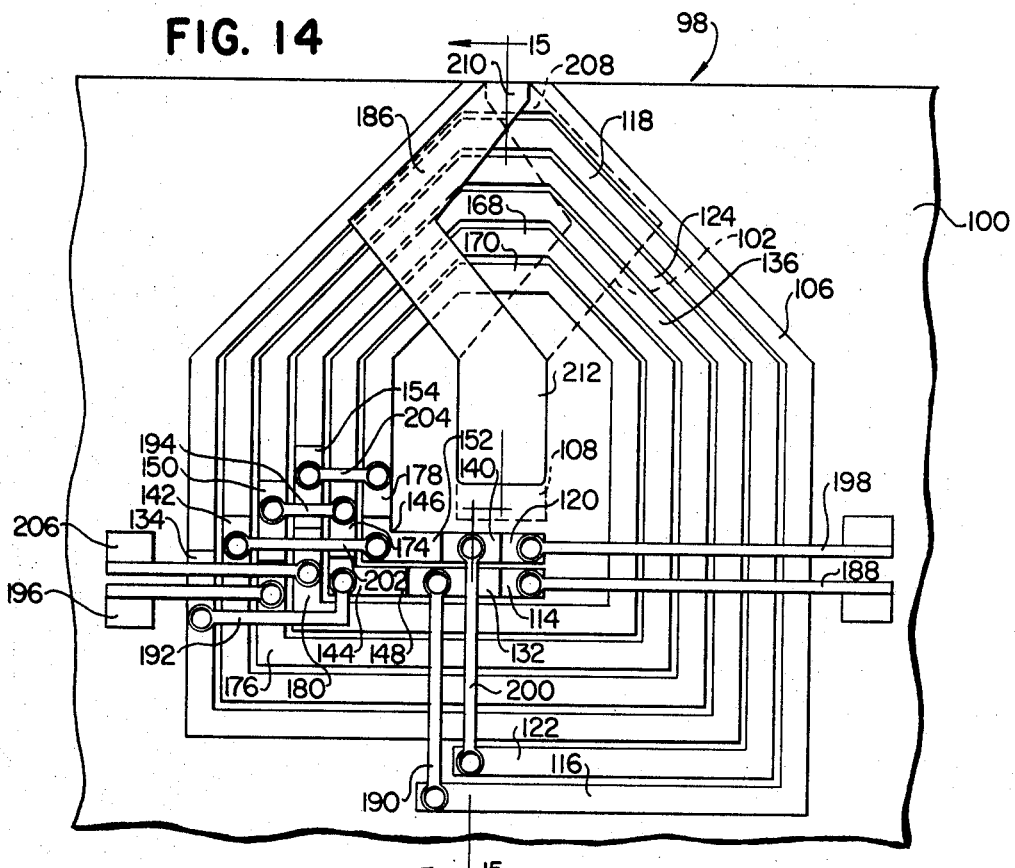

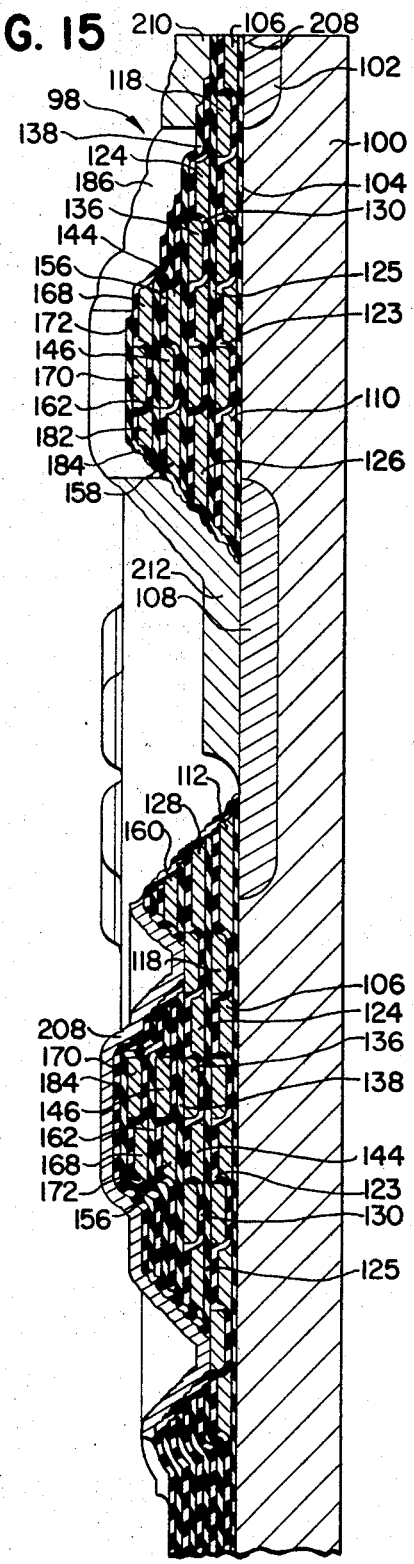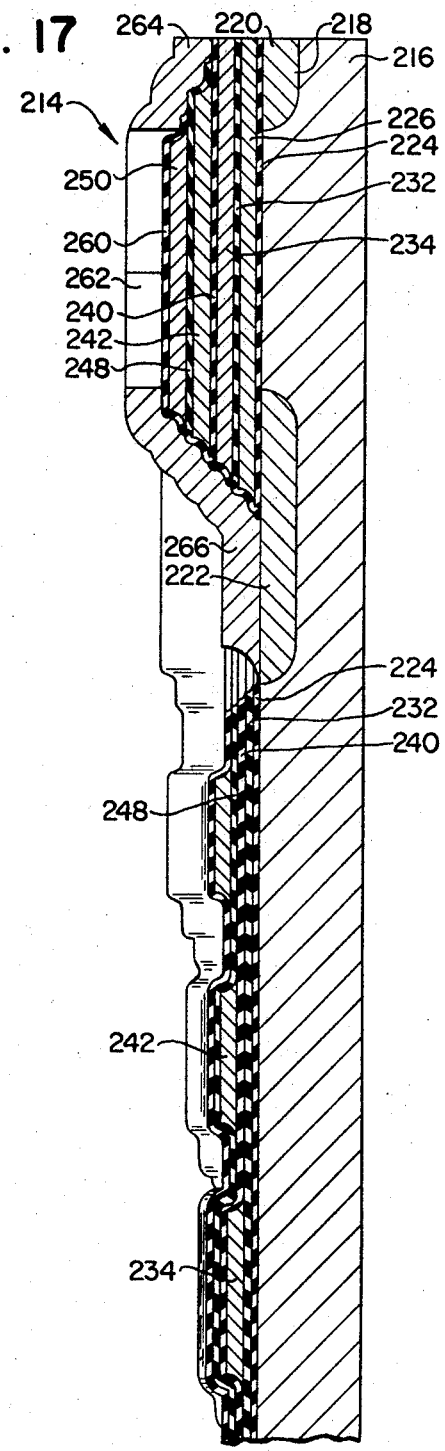

PATENTED DEC 22 1970      3,549,825

INVENTOR
CEBERN B. TRIMBLE

BY *Louis A. Kline*
*Albert L. Sessler*
*Zimmer Nargo*

HIS ATTORNEYS

MAGNETIC TRANSDUCER WITH PLANAR SPIRAL COIL EXTENDING INTO THE GAP

BACKGROUND OF THE INVENTION

This invention relates to magnetic transducers for use in magnetic recording and reproduction and to the method of making the same.

One of the problems encountered in magnetic transducers of the prior art is the high cost of producing them. The high cost is due primarily to the watchmaker type of mechanical precision required in fabricating said transducers.

The bulk of prior-art magnetic transducers are generally cubic in form with the coil thereof being wound around at least one of the legs of the magnetic core thereof. While this type of transducer provides adequate performance when properly utilized, a considerable amount of leakage flux is present between the pole tips thereof and across the many faces of the transducer core. Leakage flux is redundant, and the only useful flux in the transducer is that which extends beyond the core area to the area of the recording media with which the transducer is used. Leakage flux, however, in this prior-art transducer is of little concern because the core reluctance is small in comparison to the total leakage field reluctance. The core reluctance is relatively small in these prior-art transducers because of the large cross-sectional area of the core, compared to the mean flux path length, and because the permeability of the core material is high. When such prior-art transducers are used in magnetic switching arrangements where the information transfer rate is increased to enhance system performance, the increased switching rate results in a reduction of the permeability of the core material thereof, which in turn results in an inadequate performance of the transducer.

In contrast with the prior-art transducers, the transducers of this invention have a reduced high frequency fall-off in applications involving increased information transfer rates. The transducers of the instant invention also have several redundant leakage flux circuits requiring a relatively low core reluctance. Inherently, the core reluctance will be small in the transducers of this invention because of a short flux path length resulting from the miniaturization of the transducers.

The transducers of the present invention are batch fabricated through the use of high resolution optical masks along with advanced chemical machining and thin film deposition techniques which provide for reduced costs of fabrication and result in accurately formed, high performance transducers having a deposited coil of high winding density. In addition, the batch-fabrication techniques mentioned facilitate the production of multihead transducers.

SUMMARY OF THE INVENTION

The magnetic transducers of this invention include generally a first magnetic circuit plate which is deposited on a nonmagnetic substrate. A conductor coil means, in the general shape of a spiral, is then deposited on said first magnetic plate and said substrate and is insulated therefrom. Over the coil means is deposited a second magnetic circuit plate which is insulated therefrom. The first and second magnetic circuit plates have pole ends which are spaced apart to receive at least a portion of said coil means therebetween and to provide the gap for the transducer. The coil means include modifications for a single conductor coil, a bifilar coil construction, and a multilayered bifilar coil construction. The invention also includes a modification in which the first and second magnetic circuit plates lie in planes which intersect each other.

The general method of producing the transducers of this invention utilizes chemical machining and deposition techniques to batch fabricate the transducers. The first magnetic circuit plate previously mentioned is deposited on a nonmagnetic substrate, and a layer of conductor material is deposited thereover, with insulation layers being deposited where necessary. The layer of conductor metal is then masked to delineate the shape of the coil required. Chemical machining techniques are then employed to etch away the unwanted conductor material to leave the desired coil configuration. On top of the coil there is deposited the second magnetic circuit plate, having a pole end which is spaced from the pole end of the first magnetic circuit plate to produce the gap for the transducer. Additional steps, to be described later, are required for the various modifications of transducers disclosed herein.

BRIEF DESCRIPTION OF THE DRAWINGS

FIG. 14 is a plan view of another embodiment of this invention, showing a bifilar transducer with its coils produced in a plurality of layers.

FIG. 15 is a cross-sectional view taken along the line 15–15 of FIG. 14, showing more details of the bifilar coil construction.

FIG. 16 is a plan view of another embodiment of this invention, showing a transducer having a plurality of multilayered single turns connected together to form a single coil.

FIG. 17 is a cross-sectional view taken along the line 17–17 of FIG. 16, showing more details of the transducer shown therein.

DESCRIPTION OF THE PREFERRED EMBODIMENTS

Figure 3:
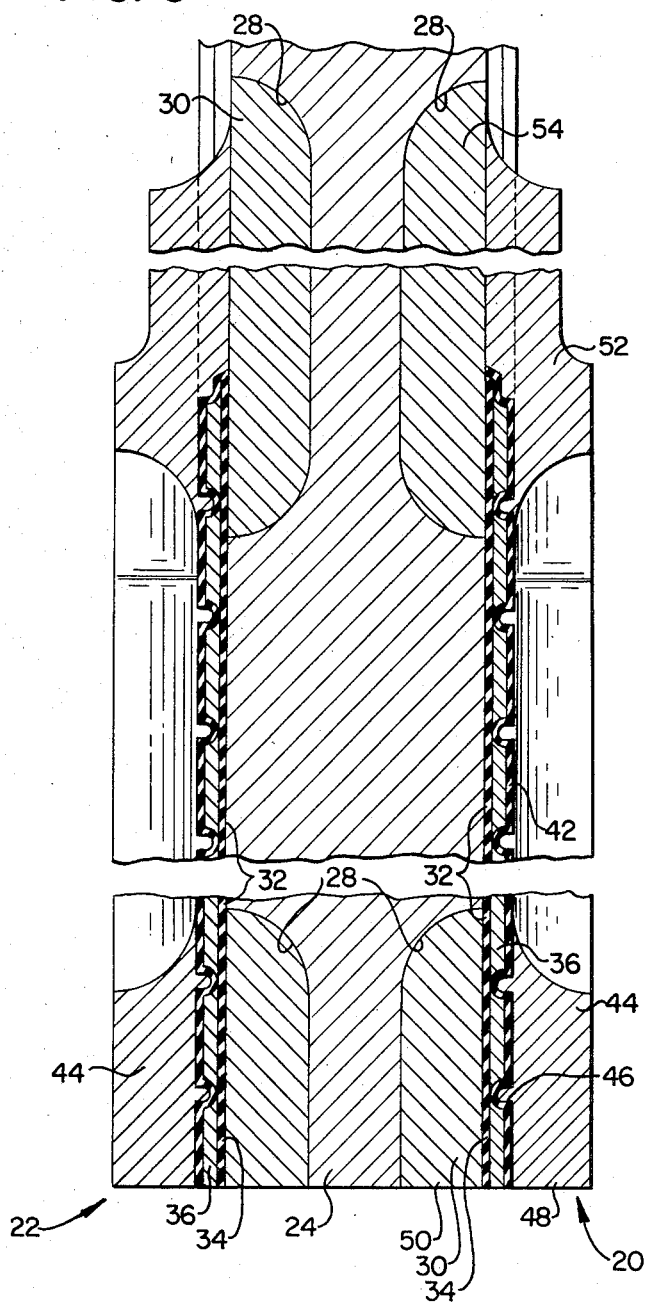
FIG. 3 is generally a cross-sectional view taken along the line 3–3 of FIG. 2, showing more details of the transducer construction.

FIG. 3 shows a first embodiment of this invention, which includes two magnetic transducers 20 and 22, which are mounted on the same substrate 24 to form a read-write transducer. Because these transducers 20 and 22 may be identical, a discussion of the construction of the transducer 20 will follow.

Figure 1:
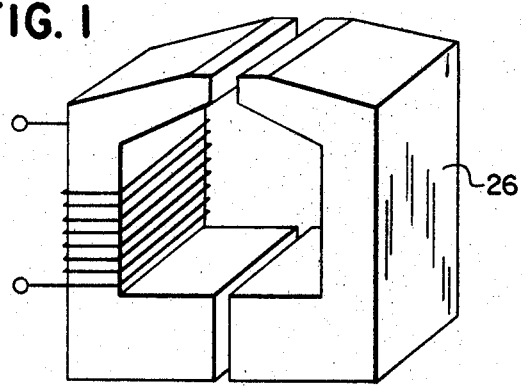
FIG. 1 is a general perspective view of a magnetic transducer of the prior art.

The transducer 20 (FIGS. 2 and 3) has a generally planar construction when compared with the prior-art transducer 26 shown in FIG. 1. The transducer 20 includes the substrate 24 having a recess 28 formed therein to receive the first magnetic circuit plate 30. The top of the plate 30 (as viewed in FIG. 3) lies in the same plane as does the surface 32 of the substrate 24, which may be of glass. A layer of insulation 34 is then deposited on the surface 32 and the plate 30 to insulate the plate 30 from the individual turns of the coil 36. If the magnetic circuit plate 30 is made of ferrite material, the insulation layer 34 is generally not needed; however, if said plate is made of permalloy material, the layer 34 is needed.

Figure 2:
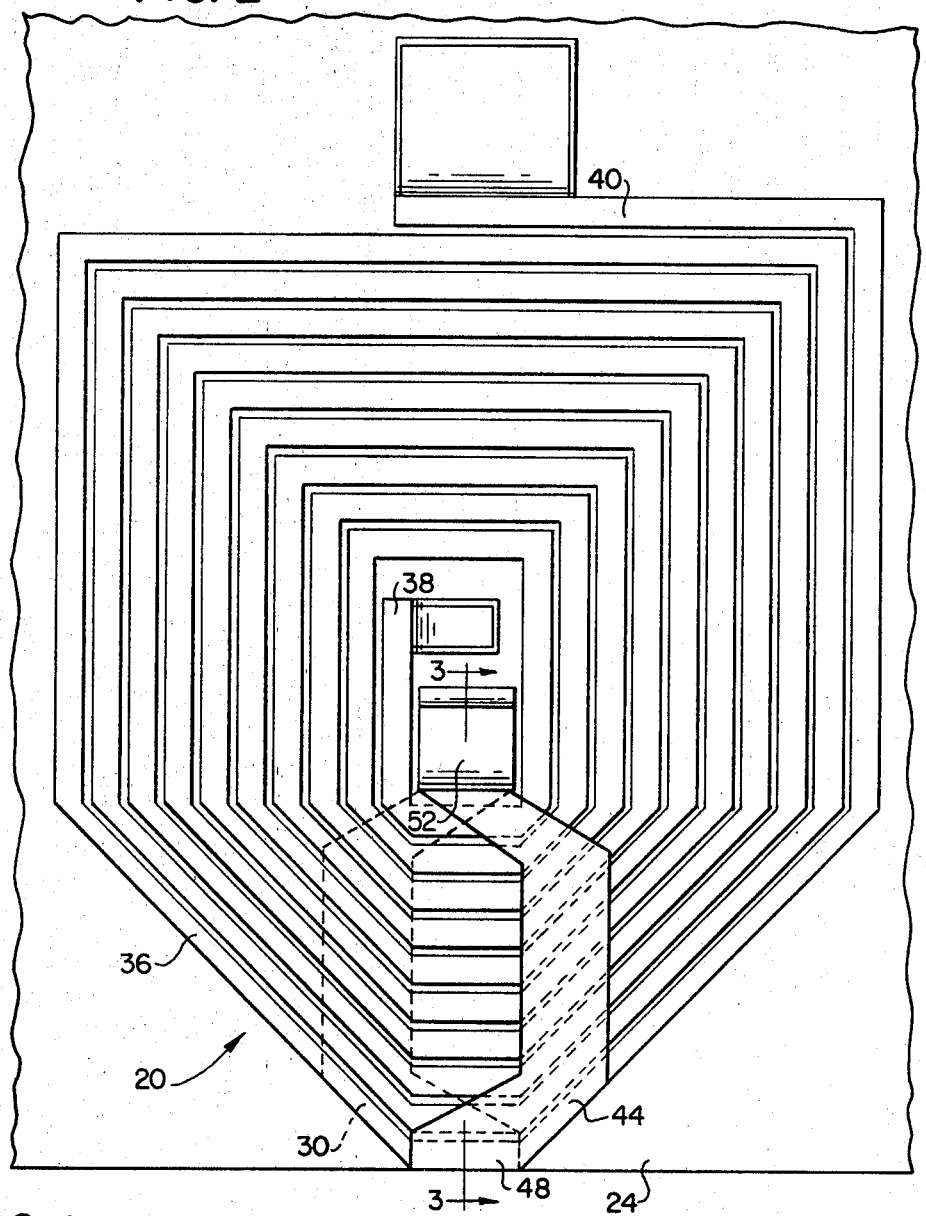
FIG. 2 is a plan view of one embodiment of the magnetic transducer of this invention, showing the deposited magnetic plates and the generally, spirally-shaped coil.

After the insulation layer 34 is deposited on the surface 32 and the plate 30, the coil 36 is formed thereon as shown in FIGS. 2 and 3. The coil 36 is generally spiral in shape, with its innermost turn beginning at 38 (FIG. 2) and its outermost turn ending at 40. The techniques used for producing the various elements of the transducer 20 will be later described in detail.

After the coil 36 is formed on the insulation layer 34 (FIG. 3), a layer of insulation 42 is deposited on the coil 36, so as to fill the spaces between adjacent turns thereof and to insulate the coil from the second magnetic circuit plate 44. The plate 44, when deposited, also has projections 46, which fill the spaces in the pockets of insulation formed between adjacent turns of the coil 36. The second plate 44 has a pole end 48, which is positioned opposite the pole end 50 of the first magnetic plate 30, as shown in FIG. 3, and the second plate 44 has a back end 52, which is in contact with the back end 54 of the first magnetic plate. When looking at the first and second magnetic plates 30 and 44 respectively (as viewed in FIG. 2), it is apparent that they are offset from each other. Being offset from each other in this manner reduces the leakage flux across the plates 30 and 44. The reluctance of the magnetic path in the plates 30 and 44 is lower with no gap at the back ends 54 and 52 as shown, although the transducer is operative with a gap at said back ends.

Figure 6:
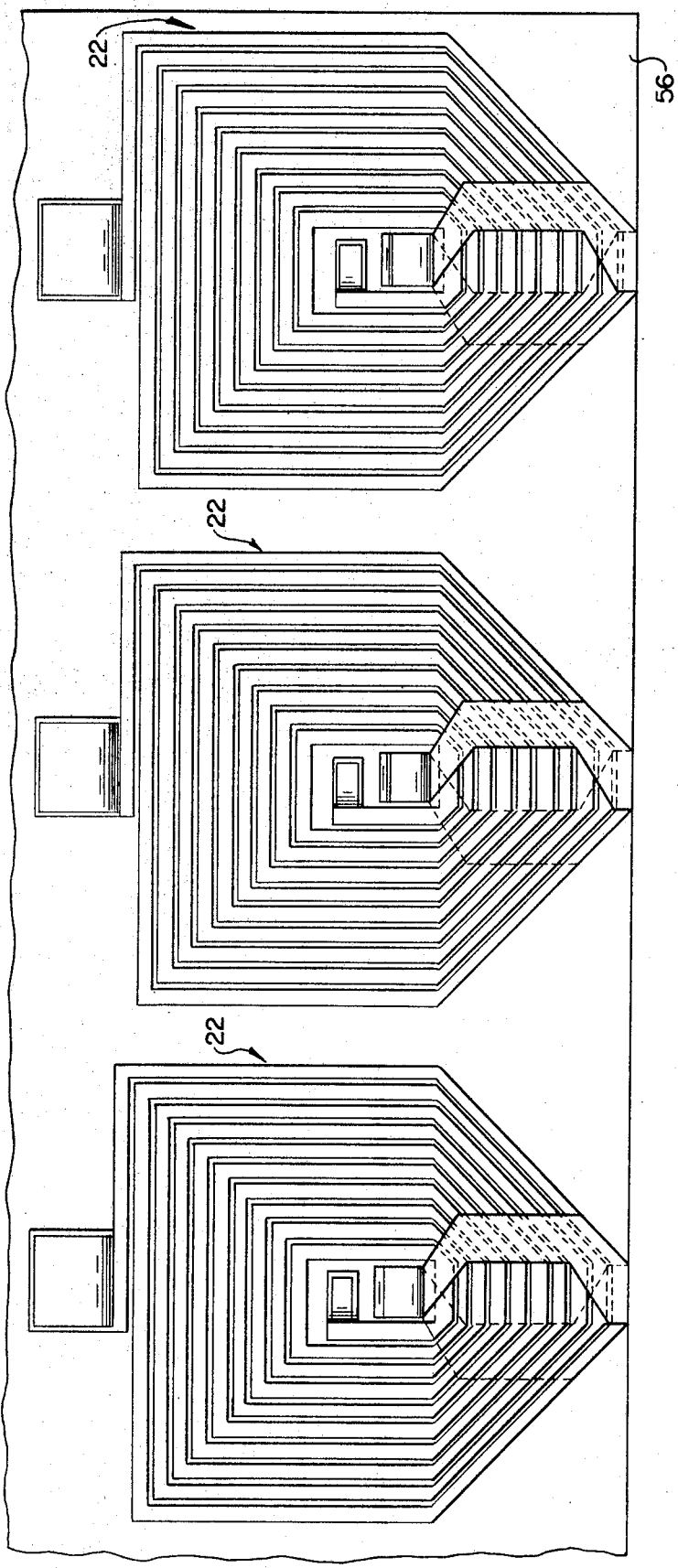
FIG. 6 is a plan view of another embodiment of this invention, showing a plurality of transducers mounted in side-by-side relation for multitrack operation.
Figure 7:
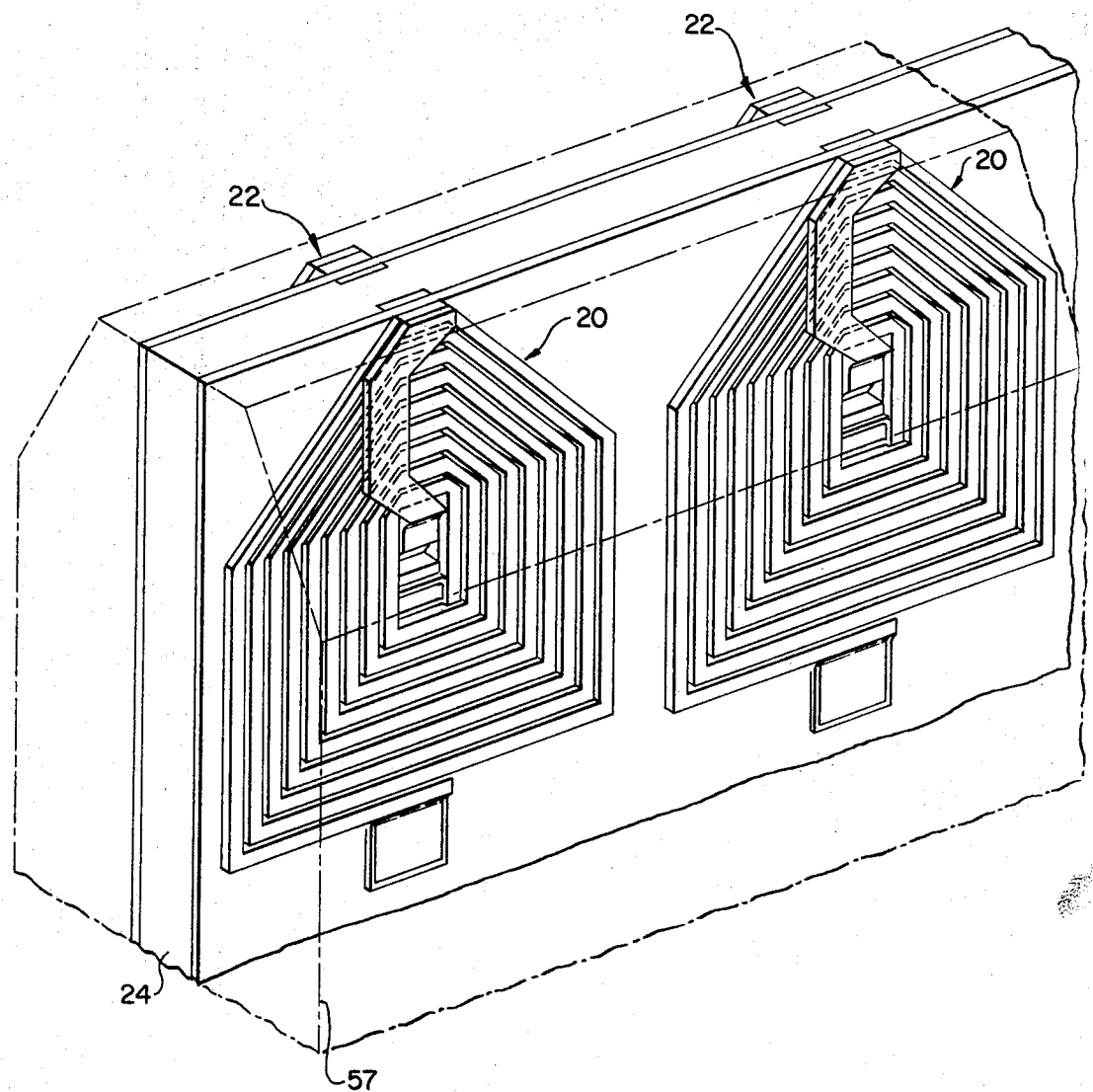
FIG. 7 is a general view in perspective of one embodiment of this invention, showing a plurality of transducers arranged on a substrate for multitrack, read-write operation.

The transducer 22 shown in FIG. 3 is identical to the transducer 20 just described; however, it is placed on the opposite side of the substrate 24. When so positioned, the transducers 22 and 24 together provide a read-write magnetic transducer head. FIG. 6 shows a plurality of transducers 22 positioned in side-by-side relation on common substrate 56 for multitrack applications. FIG. 7 shows a plurality of transducers 20 and 22 arranged on opposite sides of a common substrate 24 to form a plurality of read-write transducers for multitrack applications. The entire arrangement shown in FIG. 7 may be encapsulated in plastic 57 (shown in dashed lines) to form a flying platform which may be moved relative to the record media.

Figure 5:
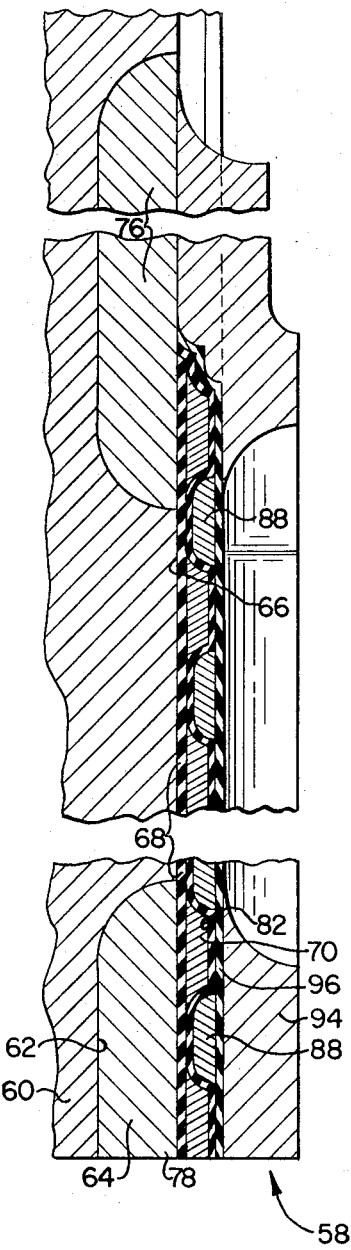
FIG. 5 is generally a cross-sectional view taken along the line 5–5 of FIG. 4, showing more details of the bifilar coil construction.
Figure 4:
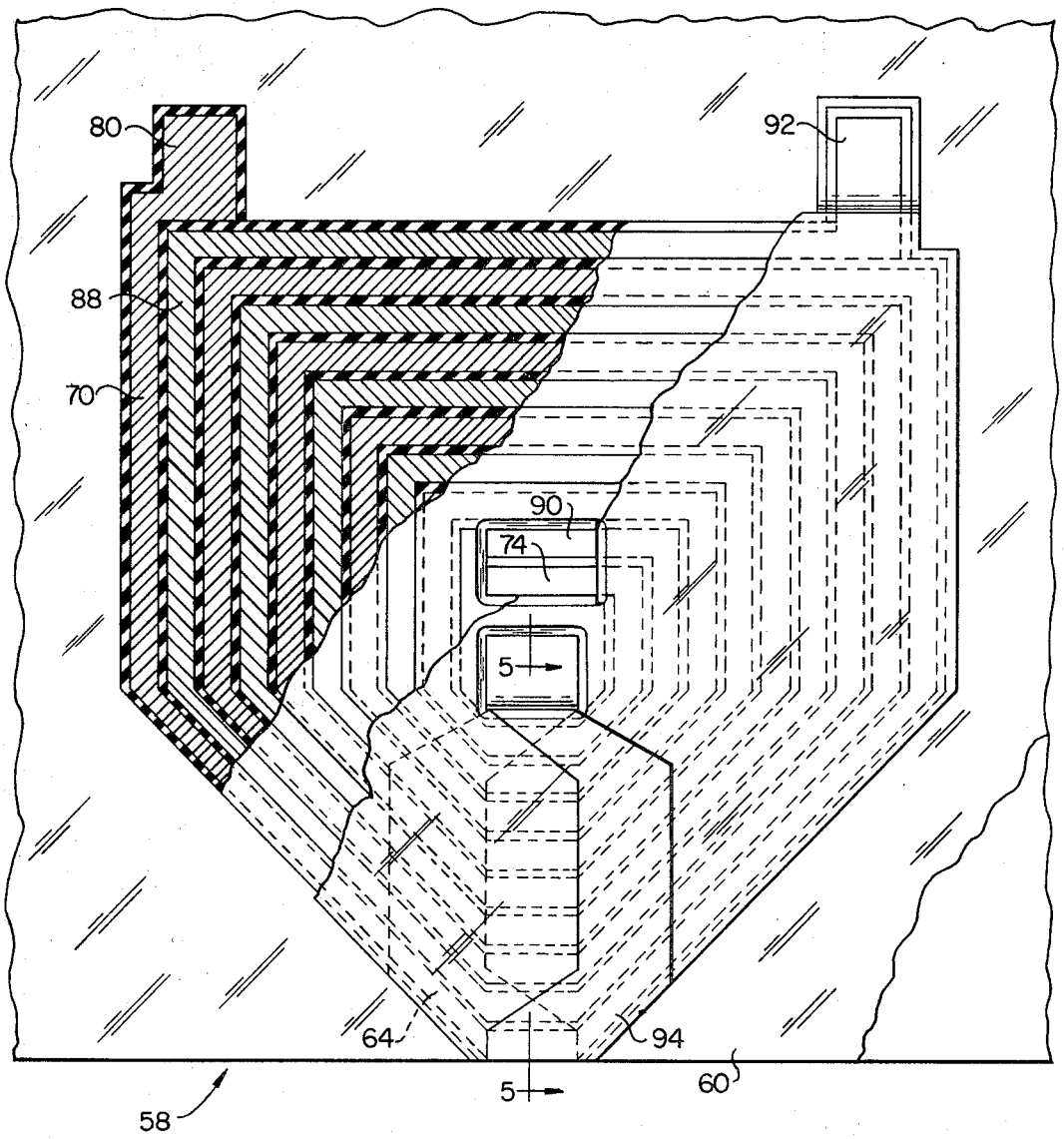
FIG. 4 is a plan view of another embodiment of this invention, showing a transducer having a bifilar coil construction.

FIGS. 4 and 5 show a second modification of this invention, in which the transducer 58 is bifilar. The method for producing this modification and the modification shown principally in FIG. 2 is substantially the same; however, more of the details of the method are brought out in a discussion of the second modification. Therefore, a detailed discussion of the method for producing the transducer 58 of this invention will now be presented.

The transducer 58 (FIGS. 4 and 5) is produced on the substrate 60 as follows. The substrate 60 may be made of glass, as previously explained, and a thin layer of tantalum (not shown) is RF-sputtered on the substrate by conventional techniques. A thin layer of gold (not shown) is similarly sputtered on the layer of tantalum. A conventional photo resist is then positioned over the gold layer to delineate the shape of the recess 62 into which the first magnetic circuit plate 64 will be positioned. The photo resist is then exposed and developed, conventionally, leaving the gold layer exposed for the area where the recess 62 will be formed. The exposed gold layer is then etched away by a conventional solution of aqua regia to expose the layer of tantalum, where the recess 62 will be formed. The layer of tantalum is then etched away by a conventional solution of hydrofluoric nitrate, which also etches the glass substrate 60 to the desired depth to form the recess 62. The tantalum and gold layers mentioned in this paragraph are utilized to form a strong bond to the substrate 60.

After the recess 62 is formed in the substrate 60, a layer of tantalum, followed by a layer of gold, is RF-sputtered on the surface of the recess 62 by the techniques already explained. The layer of gold serves as a plating electrode for electrodepositing a permalloy material in the recess 62, which is overfilled. After overfilling, the excess permalloy is abraded down, so that the top thereof (as viewed in FIG. 5) of the first magnetic plate 64 lies in the same plane as the top surface 66 of the substrate 60. A layer of glass insulation 68 is then RF-sputtered over the surface 66 and the plate 64 by conventional techniques.

Figure 9:
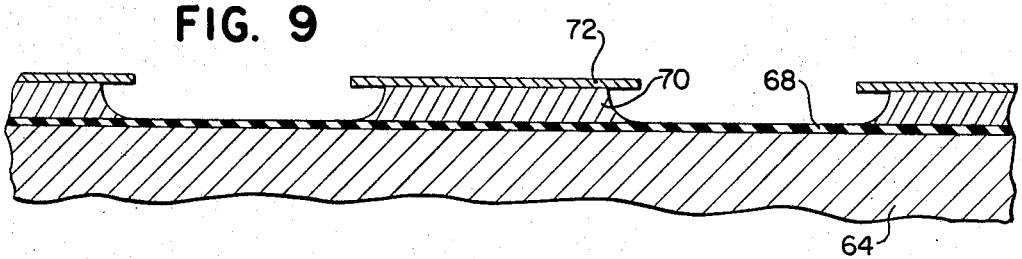
FIGS. 9 to 13 inclusive are cross-sectional views showing various stages in the method of producing a bifilar transducer according to this invention.
Figure 10:
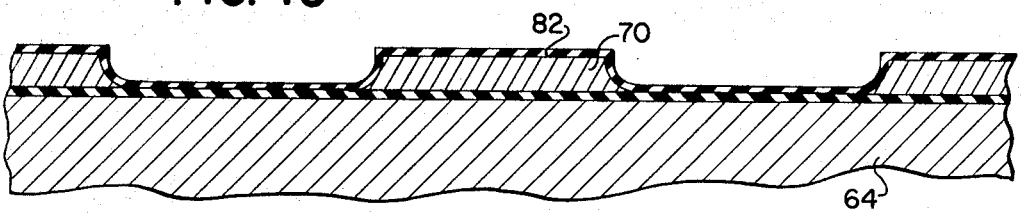

Once the layer of glass insulation 68 (FIGS. 5 and 9) is deposited on the magnetic circuit plate 64, a layer of conductor material is adhered thereto as follows. First, a layer of tantalum is sputtered on the layer 68, and over the tantalum, a layer of gold is deposited by the techniques already explained. This layer of gold (not shown) is actually a plating electrode for the layer of conductor material, such as copper, which is deposited thereon to the desired thickness, the copper layer being used to form the first coil 70, shown in FIGS. 4, 5, and 9 through 13.

The first coil 70 is produced as follows. After the layer of conductor material is deposited on the insulation layer 68 (best shown in FIG. 9), a photoresist mask 72 is placed over the layer of conductor material to delineate the desired shape of the coil 70, and the chemical machining techniques already described are used to remove the unwanted portions of conductor material, leaving the individual turns of the coil 70 separated from one another. The insulating layer 68 serves as a stop for said machining techniques. The coil 70 has the general shape of a spiral, with its inner turn 74 starting near the back gap 76 (FIG. 5) of the first magnetic plate 64, and the outer turn thereof being located near the pole end 78 of the circuit plate 64 and ending at the terminal 80 (FIG. 4).

Figure 11:
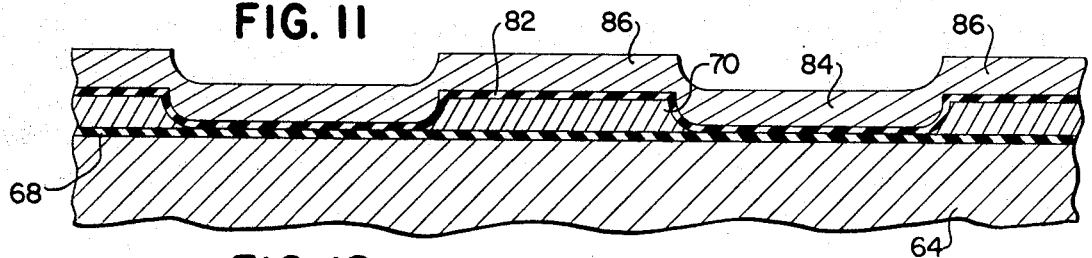

After the first coil 70 is deposited and formed, the photoresist mask 72 (FIG. 9) is removed by conventional techniques, and the transducer 58 is cleaned in preparation for depositing a second layer 82 of glass insulation by the RF-sputtering technique already mentioned. After the layer 82 is deposited, a thin layer of tantalum (not shown) is deposited thereon, which is followed by a thin layer of gold, which is deposited thereover by said sputtering technique. The gold layer (not shown) serves as a plating electrode for the layer of conductor metal 84, which is deposited thereover to the desired thickness, as shown in FIG. 11.

Figure 12:
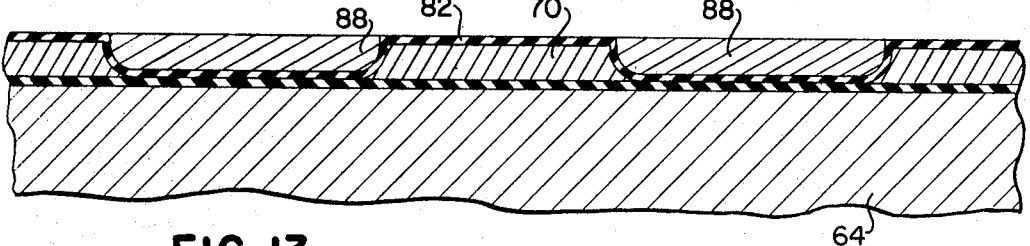
Figure 13:
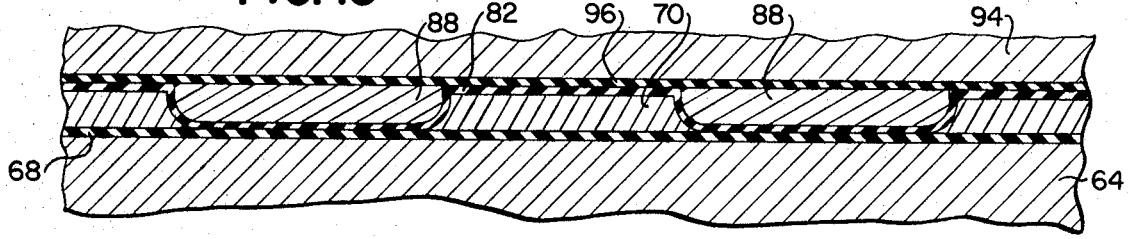
Figure 19:
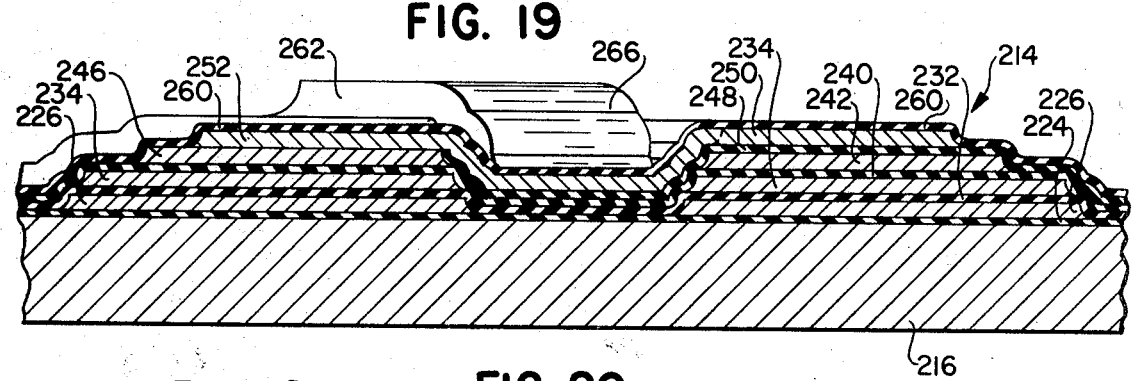
FIG. 19 is a cross-sectional view taken along the line 19–19 of FIG. 16, showing more details of the transducer shown therein.
Figure 18:
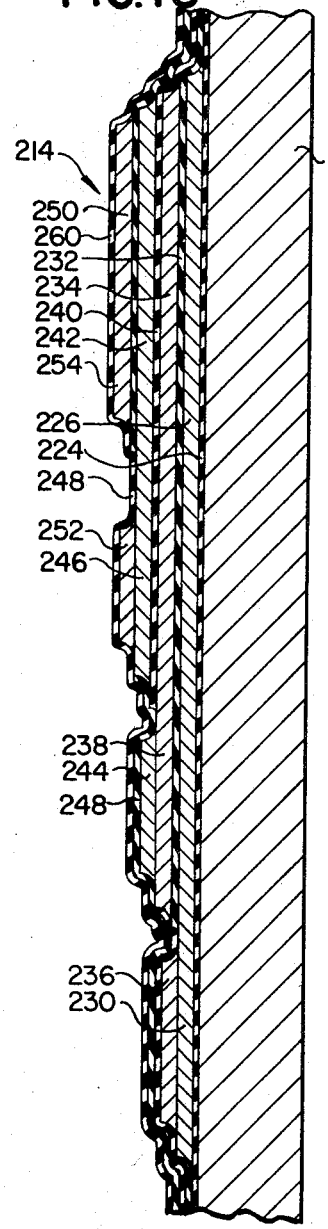
FIG. 18 is a cross-sectional view taken along the line 18–18 of FIG. 16, showing more details of the transducer shown therein.
Figure 20:
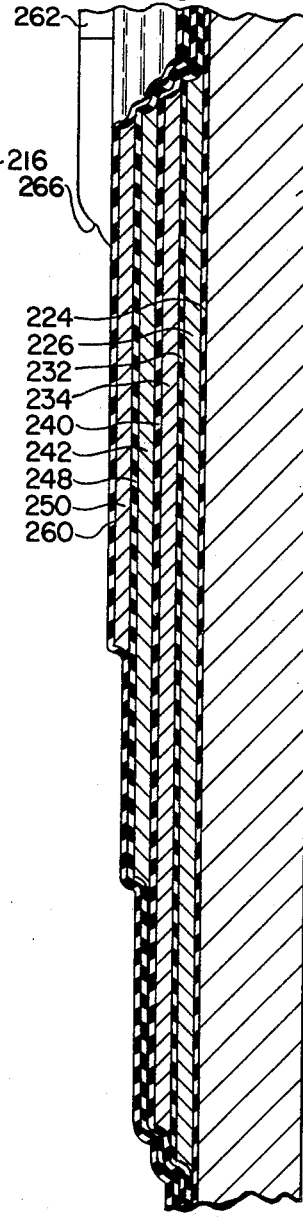
FIG. 20 is a cross-sectional view taken along the line 20–20 of FIG. 16, showing more details of the transducer shown therein.

After the layer of conductor metal 84 is deposited, those areas 86 which are positioned above the turns of the coil 70 (as viewed in FIG. 11) are abraded down to the level of the glass insulation 82 above said turns, so that the top of the metal layer 84 lies in the same plane as the top of the glass layer 82, as shown in FIG. 12. The abrasion operation produces the discrete turns of the second coil 88, and, as can be seen from FIG. 12, the turns of the second coil 88 are insulated from the turns of the first coil 70 and lie between adjacent turns of the first coil 70. As can be seen from FIG. 4, the second coil 88 has one terminal 90 near the back end of the first magnetic circuit plate 64 and the other terminal at 92, with the outer turn of said coil positioned near the pole end 78 of the first magnetic plate 64.

Prior to forming the second magnetic circuit plate 94, the portion of the transducer 58 near the back gap end 76 of the first magnetic circuit plate 64 is cleared away by using photoresist masks (not shown) and conventional chemical machining techniques to expose the end 76 of the plate 64 (FIG. 5). After the back gap end 76 is exposed, a third layer of glass insulation 96 (FIG. 5) is deposited over the entire second coil 88 and the substrate 60 except for the area of the back gap end 76. A suitable mask (not shown) can be positioned over the back gap end 76 to prevent the deposition of the glass layer 96 thereon, and it can be removed after the layer 96 is deposited to expose the end 76.

The second magnetic circuit plate 94 (FIGS. 5 and 13) is formed as follows. After the third layer 96 of insulation is deposited, a thin layer of tantalum (not shown) is deposited thereover, and a thin layer of gold (not shown) is deposited over the tantalum. The gold layer serves as a plating electrode for depositing a layer of desired thickness of permalloy material thereon, the permalloy material being formed into the second magnetic circuit plate 94 through utilizing a photoresist mask and the chemical machining techniques already described. The second magnetic circuit plate 94 has the general shape shown in FIG. 4. As shown in FIG. 4, the plates 64 and 94 are generally C-shaped, with their pole ends overlapping to form the transducer gap, with portions of the first and second coils 70 and 88, respectively, lying between said pole ends, as better shown in FIG. 5.

Figure 8:
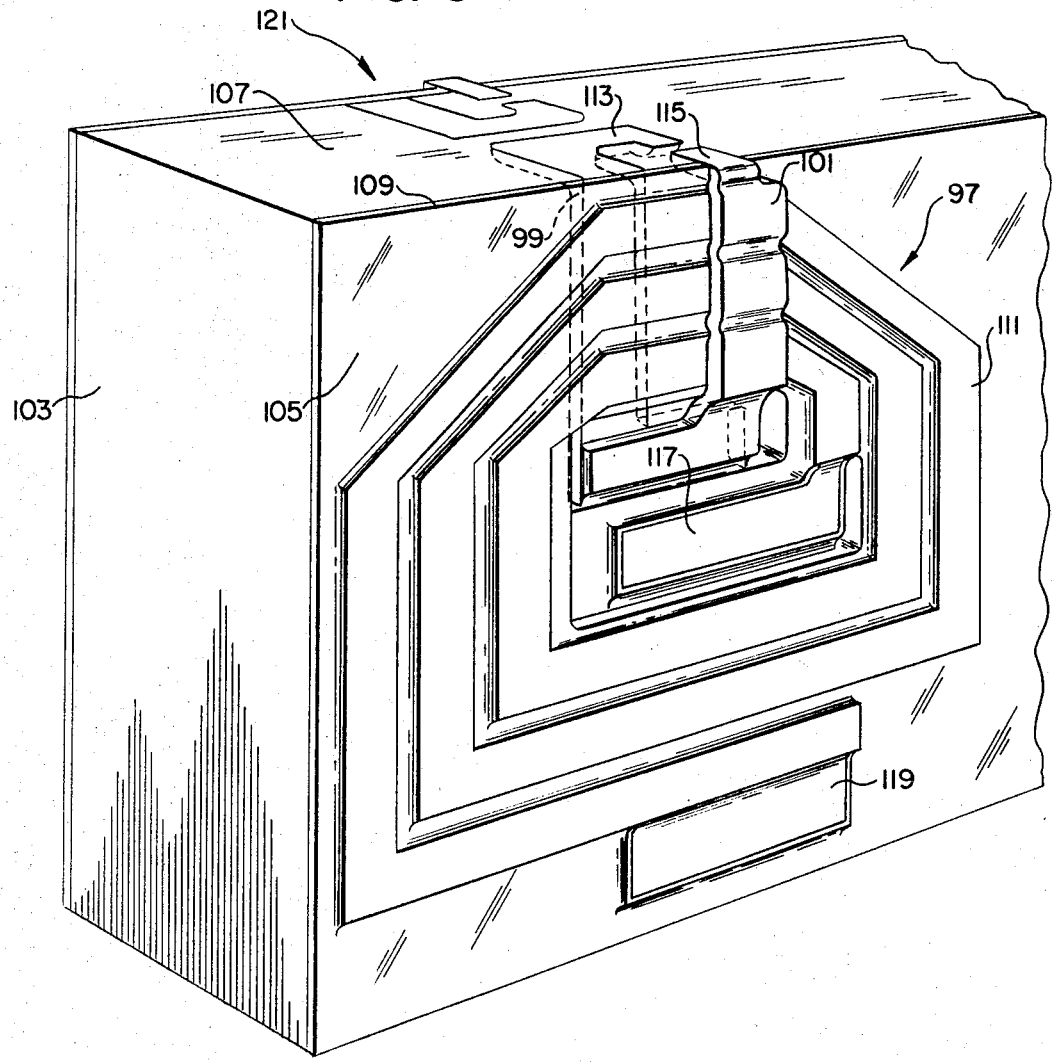
FIG. 8 is a general view in perspective of another embodiment of this invention, showing a transducer with its magnetic circuit plates lying in two different planes which are at right angles to each other.

FIG. 8 is a general view in perspective of another embodiment of this invention, showing a transducer 97 having portions of its magnetic circuit plates 99 and 101 lying in two mutually perpendicular planes. The transducer 97 is mounted on a substrate 103 by the techniques already mentioned, with a few following exceptions. Instead of being mounted in one plane, the first magnetic circuit plate 99 is deposited in a recess which extends into the mutually perpendicular faces 105 and 107 of the substrate 103, these faces joining along a common edge 109. The transducer 97 includes a coil 111, which is similar to the coil 36 (shown in FIG. 2) and which is positioned between the magnetic circuit plates 99 and 101 by the techniques already described. The circuit plate 99 has one portion lying in the face 105 and a second portion 113 lying in the face 107. The circuit plate 101 has a portion positioned generally parallel to the face 105 and a second portion 115 lying in the face 107. The portions 113 and 115 are spaced apart to form the transducing gap of the transducer 97, and the tops of the portions 113 and 115 are in the same plane as the top of the face 107 as viewed in FIG. 8. The coil 111 is provided with terminals 117 and 119 to connect it to external circuitry. A transducer 121, identical to the transducer 97, may be positioned in opposed relation on the substrate 103 to provide a read-write transducer.

FIGS. 14 and 15 show another modification of a bifilar transducer made according to this invention; however, in this transducer 98, each individual coil thereof is composed of a plurality of multilayered windings, each winding being in the general shape of a spiral and said winding being interconnected to form said coil. The transducer 98 is supported on a substrate 100, which may be glass and which has recesses formed therein to receive the first magnetic circuit plate 102 according to the techniques already explained. An insulating layer 104 is then deposited over the entire substrate 100 and the first plate 102. On top of the layer 104, the first winding 106 of the first conductor coil is formed as previously explained, with this one exception. Near the back end 108 of the first plate 102, certain portions (like 110 and 112 in FIG. 15) of the conductor material from which the winding 106 was formed are not removed when the winding 106 is formed. These portions 110 and 112 are isolated from the winding 106 and are used merely as fillers to facilitate the construction of the transducer 98, as will be explained later. The beginning of the first winding of the first coil starts at 114 and ends at 116 (FIG. 14).

As can best be seen in FIG. 14, the first winding 118 of the second coil of the transducer starts at 120 and ends at 122. The individual turns of the winding 118 are located slightly above and between the individual turns of the winding 106 of the first coil, as shown in FIG. 15, by the techniques already described in relation to the embodiment shown in FIGS. 4, 5, and 9 through 13 inclusive. The winding 118 is insulated from the winding 106 by a layer 123 of glass insulation. The top of the winding 118 and the top of the insulation layer 123 lie in the same plane, over which another layer 125 of glass insulation is deposited.

After the layer 125 of glass insulation is deposited, a second winding 124 of the first coil of the transducer 98 is formed thereon, as shown in FIGS. 14 and 15, with the filler portions 126 and 128 (FIG. 15) being formed at the same time. After the second winding 124 is formed, it is insulated by a layer 130 of glass insulation. The winding 124 begins at 132 (FIG. 14) and ends at 134.

After the second winding 124 of the first coil of the transducer 98 is formed, the second winding 136 of the second coil is formed on the layer 130 of glass insulation already deposited by the techniques already described. The top of the winding 136 lies in the same plane as the top of the insulation layer 130, as viewed in FIG. 15, and another layer of glass insulation 138 is deposited over this plane. The winding 136 starts at 140 and ends at 142 (FIG. 14) and has the generally spiral shape shown.

The third winding 144 of the first coil and the third winding 146 of the second coil (FIGS. 14 and 15) are formed in the same manner as the other windings of the transducer 98. The winding 144 starts at 148 and ends at 150 (FIG. 14). The winding 146 starts at 152 and ends at 154. Both windings 144 and 146 are generally spiral in shape and generally overlie the other windings of their respective coils, and are insulated from each other by a layer 156 of glass insulation. The filler portions 158 and 160 are formed at the same time that the winding 144 is formed. The top of the winding 146 lies in the same plane as the top of the layer 156 of glass insulation, and another layer 162 of glass insulation is deposited over this plane.

The fourth winding 168 of the first coil and the fourth winding 170 of the second coil of the transducer 98, as shown in FIGS. 14 and 15, are formed by the same techniques as the other windings thereof, and the windings 168 and 170 are insulated from each other by the layer 172 of glass. The fourth winding 168 starts at 174 and ends at 176 (FIG. 14), and the fourth winding 170 starts at 178 and ends at 180, both said windings having the generally spiral shape shown. The filler portion 182 (FIG. 14) is formed when the winding 168 is formed.

After the windings 168 and 170 are formed, a layer 184 of glass is deposited over all the said windings of the transducer 98, as shown in FIG. 15. The filler portions 110, 126, 158, and 182, previously mentioned, provide a gradual slope for better supporting the back end of the second magnetic circuit plate 186 on the layer 184 of insulation.

In order to connect the individual windings of the first and second coils of the bifilar transducer 98 shown in FIGS. 14 and 15, the following construction is used. The individual windings (106, 124, 144, and 168) of the first coil are connected together as follows. A terminal conductor strip 188 is connected to the starting end 114 of the first winding, as shown in FIG. 14. In order to expose the end 114 prior to securing the strip 188 thereto, it was necessary to take steps to remove the various layers of glass insulation which may have been deposited thereover during the process of producing the transducer 98. These steps are conventional and need not be recited here in detail. The remaining end 116 of the first winding 106, after being exposed, is connected to the beginning end 132 of the second winding 124 by the conductor strip 190, which may be deposited by conventional techniques. The remaining end 134 of the second winding 124 is connected to the beginning end 148 of the third winding 144 by the conductor strip 192. In a similar manner, the remaining end 150 of the third winding 144 is connected to the beginning end 174 of the fourth winding 168 by the conductor strip 194. The remaining end 176 of the fourth winding 168 has a terminal conductor strip 196 connected thereto, as shown in FIG. 14.

The individual windings (118, 136, 146, and 170) of the second coil of the bifilar transducer 98 are connected to form one continuous coil as follows. The first winding 118 has a terminal conductor strip 198 connected to the beginning end 120 thereof, as shown in FIG. 14. The ends of the several windings of said second coil are exposed by removing any insulation layers which may be present thereover, as previously explained. The remaining end 122 of the first winding 118 is connected to the beginning end 140 of the second winding 136 by the conductor strip 200. The remaining end 142 of the second winding 136 is connected to the beginning end 152 of the third winding 146 by the conductor strip 202. In a similar manner, the remaining end 152 of the third winding 146 is connected to the beginning end 178 of the fourth winding 170 by the conductor strip 204. The remaining end 180 of the fourth winding 146 has a terminal conductor strip 206 connected thereto as shown.

After the first and second coils of the bifilar transducer 98 are connected as just explained, a protective layer 208 (FIG. 15) of glass insulation may be deposited thereover to protect the individual windings and conductor strips. The second magnetic circuit plate 186 is then formed on the transducer 98 by the techniques already explained. As is apparent from FIG. 15, portions of the first and second coils lie between the first and second magnetic circuit plates 102 and 186, respectively, and the pole ends 208 and 210, respectively, thereof are spaced apart to produce the transducer gap. The back ends 108 and 212 of the plates 102 and 186, respectively, may be joined as shown in FIG. 15, or they may be spaced apart according to design requirements.

FIGS. 16 through 20 show another transducer 214 of this invention; however, this transducer has a single coil, which is made of a plurality of multilayered, single-turn conductor windings as follows. The transducer 214 is supported on a substrate 216, which may be glass, and the substrate has recesses formed therein into which the first magnetic circuit plate 218 (having a pole end 220 and a back end 222) is positioned and formed according to the techniques previously described. A thin planar layer 224, of glass insulation, is then deposited over said substrate 216 and circuit plate 218. The first turn 226 is formed on the glass layer 224 and has terminal ends 228 and 230 and the general shape shown in FIG. 16. On top of the first turn 226, there is deposited a second layer 232 of glass insulation. The second turn 234 is formed on the second layer 232 and has the general shape best shown in FIG. 16. The second turn 234 of the coil has one end 236 thereof connected to the end 230 of the first turn 226, and its other end terminates at 238. It is apparent from FIG. 16 that the individual turns (226, 234) of the coil, when connected in series, conform to the general shape of a spiral.

After the second turn 234 of the transducer 214 is formed, a layer 240 of glass insulation is deposited thereover, and the third turn 242 is then formed on the layer 240 (FIGS. 16, 17, 18, 19, and 20). The turn 242 has the general shape shown in FIG. 16 and has one end 244 connected to the end 238 of the second turn 234, and the remaining end thereof terminates at 246. On top of the third turn 242 is deposited a layer 248 of glass insulation, over which is deposited the fourth turn 250 of the coil. The fourth turn 250 has one end 252 connected to the end 246 of the turn 242 and its other end terminating at 254. A suitable connecting terminal 256 (FIG. 16) is connected to the end 254 of the fourth turn 250, and a similar terminal 258 is connected to the beginning end 228 of the first turn 226 to enable the transducer to be connected to external circuitry. A layer 260 of glass insulation is then deposited over the fourth turn 250.

The second magnetic circuit plate 262 is then formed on the layer 260 according to the techniques already described. The plate 262 has a pole end 264 (best shown in FIG. 17) and a back gap end 266. The pole end 264 is spaced from the pole end 220 of the first plate 218 to form the gap of the transducer 214, with portions of its coil positioned between said pole ends. The back ends 222 and 266 of the plates 218 and 262, respectively (FIG. 17), may be connected as shown, or they may be spaced apart according to design requirements.

While the forms of the invention shown and described herein are admirably adapted to fulfill the requirements primarily stated, it is to be understood that it is not intended to confine the invention to the forms or embodiments disclosed herein, for it is susceptible of embodiment in various other forms.

I claim:

1. A magnetic transducer comprising:
   a nonmagnetic substrate having one surface with a recess therein;
   a first magnetic circuit plate having one side positioned in said recess and secured to said substrate thereat and having the opposite side of the plate lying in the same plane as said surface of the substrate; said plate having first and second end portions;
   a first integrally-formed insulating layer covering and adhering to said one side of the substrate and said opposite side of said first magnetic circuit plate;
   at least one planar conductor coil, generally in the shape of a spiral supported on and adhering to said insulating layer, said coil having one end near the center thereof and the second end near the outer boundary thereof, said coil having at least a portion thereof positioned over said first plate;
   a second integrally-formed insulating layer covering and adhering to said coil;
   a second magnetic circuit plate adhering to said second insulating layer, and having first and second end portions; and
   said first end portions of said first and second plates being positioned at the outer boundary of said coil forming opposed, spaced pole tips with said coil being positioned therebetween; said second end portions of said first and second plates being located near the center of said coil.

2. A bifilar magnetic transducer comprising:
   a nonmagnetic substrate having one surface with a recess therein;
   a first magnetic circuit plate having one side positioned in said recess so as to enable the opposite side of the plate to lie in the same plane as the surface of the substrate;
   said plate having first and second end portions;
   a first integrally-formed insulating layer covering said substrate and first plate thereon;
   a first planar conductor coil, generally in the shape of a spiral, supported on said first layer, said coil having one end near the center thereof and a second end near the outer boundary thereof, said coil having at least a portion thereof positioned over said first plate;
   a second integrally-formed insulating layer covering said first coil and portions of said first insulating layer;
   a second planar conductor coil, generally in the shape of a spiral supported on said second insulating layer and having turns which are alternated between the turns of said first coil;
   a third integrally-formed insulating layer covering said second coil and portions of said second insulating layer;
   a second magnetic circuit plate supported on said third insulating layer and having first and second end portions; and
   said first end portions of said first and second plates being positioned at the outer boundaries of said coils forming opposed pole tips with said coils being positioned therebetween, said second end portions of said first and second plates being located near the centers of said coils.

3. A magnetic transducer comprising:
   a nonmagnetic substrate;
   a first magnetic circuit plate supported on said substrate and having first and second end portions;
   at least one planar conductor coil, generally in the shape of a spiral, said coil having one end near the center thereof and the second end near the outer boundary thereof, at least a portion of said coil being insulatingly supported on said first plate;
   a second magnetic circuit plate insulatingly supported on at least a portion of said coil and having first and second end portions;
   said substrate having first and second sides which intersect along a common edge;
   a first side having therein recesses into which said first end portions of said first and second plates fit to form opposed pole tips;
   said second side having therein a recess into which said second end portion of said first plate is positioned;
   said second end portion of said second plate being substantially parallel to said second end portion of said first plate;
   said first and said second plates each having therein a bend which is located at said common edge; and said coil being positioned between said second end portions of said first and second plates.

4. A magnetic transducer comprising:
a nonmagnetic substrate;
a first magnetic circuit plate supported on said substrate and having first and second end portions;
a first multiturn coil comprising a plurality of planar coil windings with each said winding being generally in the shape of a spiral;
the first one of said windings having a portion insulatingly supported on said first plate; the remaining said windings being insulatingly superposed on said first winding and one another;
first conductor segments joining the ends of said windings to form said coil;
a second multiturn coil similar to said first multiturn coil and having a plurality of planar windings which are insulatingly supported and alternated in generally superposed relation with the windings of the first coil;
second conductor segments joining the ends of said windings of said second coil to form it;
a second magnetic circuit plate insulatingly supported on a portion of said second multiturn coil, and having first and second end portions; and
said first end portions of said first and second plates being positioned at the outer peripheral boundary of said coils, thereby forming spaced opposed pole tips with portions of said coils being positioned therebetween, said second end portions of said first and second plates being located near the center of said coils and joined together to form a magnetic coupling therewith.

5. The transducer as claimed in claim 4 in which each of said windings has a diametral length which decreases when viewed in a direction going from said first one towards said last one of said windings.

6. The transducer as claimed in claim 4 in which said first and second conductor segments are located on the same side of said transducer.

7. The transducer as claimed in claim 6 in which said first and second magnetic circuit plates are generally C-shaped in opposed and offset relation with each other and with portions of said first and second coils being positioned between said first end portions of said magnetic circuit plates.